United States Patent
Rheaume et al.

(10) Patent No.: US 11,713,132 B2
(45) Date of Patent: Aug. 1, 2023

(54) FUEL TANK INERTING SYSTEM AND METHOD

(71) Applicant: Hamilton Sundstrand Corporation, Charlotte, NC (US)

(72) Inventors: Jonathan Rheaume, West Hartford, CT (US); Kimberly Saviers, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 879 days.

(21) Appl. No.: 16/593,681

(22) Filed: Oct. 4, 2019

(65) Prior Publication Data

US 2021/0101693 A1    Apr. 8, 2021

(51) Int. Cl.
| | | |
|---|---|---|
| *B64D 37/32* | (2006.01) | |
| *B01D 53/32* | (2006.01) | |
| *B01D 53/86* | (2006.01) | |
| *B64D 27/12* | (2006.01) | |
| *B64D 13/06* | (2006.01) | |

(52) U.S. Cl.
CPC .......... *B64D 37/32* (2013.01); *B01D 53/326* (2013.01); *B01D 53/8671* (2013.01); *B64D 27/12* (2013.01); *B01D 2257/104* (2013.01); *B64D 13/06* (2013.01); *B64D 2013/0618* (2013.01)

(58) Field of Classification Search
CPC .... B64D 37/32; B64D 27/12; B01D 53/8671; B01D 53/326; B01D 2257/104
USPC ...................................................... 244/135 R
See application file for complete search history.

(56) References Cited

U.S. PATENT DOCUMENTS

| | | |
|---|---|---|
| 7,152,635 B2 | 12/2006 | Moravec et al. |
| 7,191,983 B2 | 3/2007 | Loss et al. |
| 7,694,916 B2 | 4/2010 | Limaye et al. |
| 7,896,292 B2 | 3/2011 | Limaye et al. |
| 7,918,358 B2 | 4/2011 | Gupta |
| 7,955,424 B2 | 6/2011 | Gupta |
| 8,192,532 B1 | 6/2012 | Gupta |
| 8,777,165 B2 | 7/2014 | Roscoe et al. |
| 8,808,428 B2 | 8/2014 | Gupta |
| 9,016,078 B2 | 4/2015 | Gupta |
| 9,718,556 B2 | 8/2017 | Moravec et al. |

(Continued)

FOREIGN PATENT DOCUMENTS

| | | | |
|---|---|---|---|
| EP | 2644507 A2 | 10/2013 | |
| EP | 3284676 A1 * | 2/2018 | ............... A62C 3/08 |

(Continued)

OTHER PUBLICATIONS

Extended European Search Report issued in Application No. 19212267.9 dated Jul. 15, 2020, 8 pages.

(Continued)

*Primary Examiner* — Anita Nassiri-Motlagh
(74) *Attorney, Agent, or Firm* — Cantor Colburn LLP (57) ABSTRACT

A system and method for inerting a fuel tank is disclosed. A fluid including non-condensable gas is directed from a vapor space in the fuel tank to a suction port of an ejector, and a motive fluid is directed to a motive fluid port of the ejector. The motive fluid and the non-condensable gas fluid are combined in the ejector and are directed from an outlet port of the ejector to the fuel tank. An inert gas is provided to the ejector motive fluid port, or to the second flow path, or to the first flow path.

13 Claims, 8 Drawing Sheets

(56) References Cited

U.S. PATENT DOCUMENTS

| | | |
|---|---|---|
| 9,963,792 B2 | 5/2018 | Rheaume |
| 10,060,781 B2 | 8/2018 | Nguyen et al. |
| 2008/0128048 A1* | 6/2008 | Johnson ................ B64D 37/32 141/59 |
| 2011/0262309 A1 | 10/2011 | Limaye et al. |
| 2017/0167036 A1 | 6/2017 | Tew et al. |
| 2018/0127110 A1* | 5/2018 | Cordatos ............... B64D 37/32 |
| 2018/0148191 A1 | 5/2018 | Smith et al. |
| 2018/0155049 A1 | 6/2018 | Smith et al. |
| 2018/0222598 A1* | 8/2018 | Surawski ............... A62C 3/065 |
| 2018/0229853 A1 | 8/2018 | Sarkar et al. |
| 2019/0047721 A1 | 2/2019 | Rheaume et al. |
| 2019/0282951 A1 | 9/2019 | Rheaume et al. |

FOREIGN PATENT DOCUMENTS

| | | | |
|---|---|---|---|
| EP | 3421374 A1 | 1/2019 | |
| EP | 3543142 A1 | 9/2019 | |

OTHER PUBLICATIONS

Rheaume et al.; "Inerting Gas Systems for Aircraft"; U.S. Appl. No. 16/158,505, filed Oct. 12, 2018.

* cited by examiner

FUEL TANK INERTING SYSTEM AND METHOD

BACKGROUND

The subject matter disclosed herein generally relates to systems for generating and providing inert gas, oxygen, and/or power on vehicles, and more specifically to fluid flow operation of such systems.

It is recognized that fuel vapors within fuel tanks become combustible or explosive in the presence of oxygen. An inerting system decreases the probability of combustion or explosion of flammable materials in a fuel tank by maintaining a chemically non-reactive or inert gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inert gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, etc.) with onboard inert gas generating systems, which supply nitrogen-enriched air to the vapor space (i.e., ullage) within the fuel tank. It is also known to store inert gas such as Halon onboard for fire suppression systems. In the case of nitrogen-enriched air, the nitrogen-enriched air has a substantially reduced oxygen content that reduces or eliminates oxidizing conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air. Another type of gas separator is based on an electrochemical cell such as a proton exchange membrane (PEM) electrochemical cell, which produces NEA by electrochemically generating protons for combination with oxygen to remove it from air.

BRIEF DESCRIPTION

A system is disclosed for inerting a fuel tank. The system includes a fuel tank including a liquid space and a vapor space therein, and a first flow path that receives fluid comprising non-condensable gas from the fuel tank vapor space. The system also includes an ejector including a suction port that receives the fluid comprising non-condensable gas from the first flow path, a motive fluid port that receives a motive fluid from a source of motive fluid, and an outlet port that discharges the motive fluid and the fluid comprising non-condensable gas. The ejector outlet port flows along a second flow path to the fuel tank. The system further includes a first gas treatment module fluidly, fluidly connected to the ejector or the first or second flow paths.

In some aspects, the first gas treatment module can reduce combustibility of a gas at the ejector or on the first or second flow paths.

In some aspects, the first gas treatment module can provide inert gas to the ejector motive fluid port.

In some aspects, the first gas treatment module can receive air from an air source, and can discharge oxygen-depleted air to the ejector motive fluid port.

In any one or combination of the foregoing aspects, first gas treatment module can include an oxygen separation medium that removes oxygen from the air received from the air source.

In any one or combination of the foregoing aspects, the first gas treatment module can include a catalytic reactor that reacts oxygen from the air source with a hydrocarbon fuel.

In any one or combination of the foregoing aspects, the first gas treatment module can include an electrochemical cell that removes oxygen from a gas stream.

In any one or combination of the foregoing aspects, the system can further include a second gas treatment module disposed on the first flow path or on the second flow path.

In any one or combination of the foregoing aspects, the second gas treatment module can include a heat exchanger in operative thermal communication with a heat sink.

In any one or combination of the foregoing aspects, the second gas treatment module can include a fuel vapor removal module.

In any one or combination of the foregoing aspects, the fuel vapor removal module can include a fuel vapor separation medium.

In any one or combination of the foregoing aspects, the second gas treatment module can include an oxygen removal module.

In any one or combination of the foregoing aspects, the oxygen removal module can include a catalytic reactor that reacts oxygen with a fuel, or an electrochemical cell that removes oxygen from a gas stream.

In any one or combination of the foregoing aspects, the first gas treatment module can be disposed on the second flow path or the first flow path.

In any one or combination of the foregoing aspects, the first gas treatment module can include an oxygen removal module.

In any one or combination of the foregoing aspects, the oxygen removal module can include a catalytic reactor that reacts oxygen with a hydrocarbon fuel, or an electrochemical cell that removes oxygen from a gas stream.

In any one or combination of the foregoing aspects, the system can further include a heat exchanger in operative thermal communication with a heat sink, disposed on the first flow path or on the second flow path.

In any one or combination of the foregoing aspects, the first gas treatment module can include a heat exchanger in operative thermal communication with a heat sink.

Also disclosed is an aircraft, comprising an aircraft body, a fuel tank, an engine with a fuel inlet in operative fluid communication with the fuel tank, and a system for inerting the fuel tank according to any one or combination of the foregoing aspects.

Also disclosed is a method of inerting a fuel tank. According to the method, a fluid comprising non-condensable gas is directed from a vapor space in the fuel tank to a suction port of an ejector, and a motive fluid is directed to a motive fluid port of the ejector. The motive fluid and the fluid comprising non-condensable gas are combined in the ejector and are directed from an outlet port of the ejector to the fuel tank. An inert gas is provided: to the ejector motive fluid port, or to the second flow path, or to the first flow path.

Also disclosed is a system for inerting a fuel tank. The system includes a fuel tank including a liquid space and a vapor space therein. The system also includes an ejector including a suction port, a motive fluid port, and an outlet port. The system also includes a first flow path from the fuel tank vapor space to the ejector suction port. A source of an inert gas is in operative fluid communication with the ejector motive fluid port, and the ejector outlet port outputs to a second flow path to the fuel tank.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may involve electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
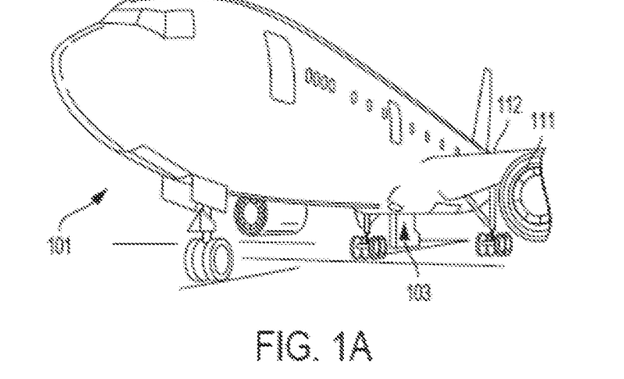
FIGS. 1A and 1B are schematic illustrations of different views of an aircraft.
Figure 1B:
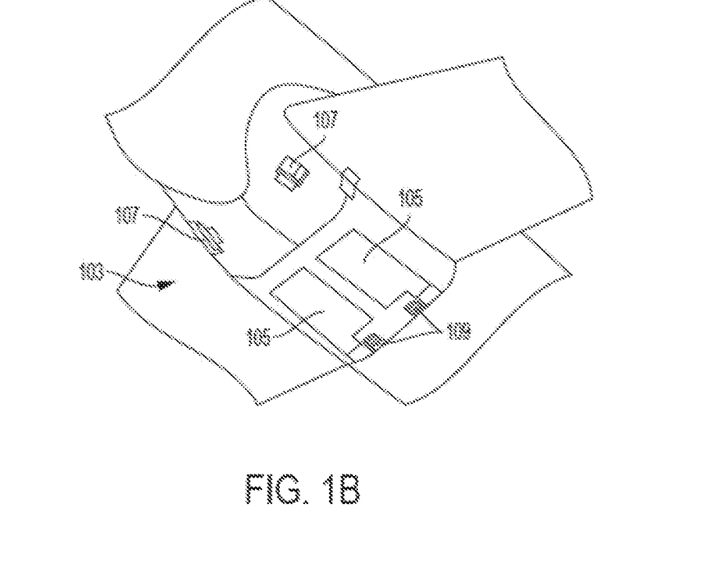

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inert gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
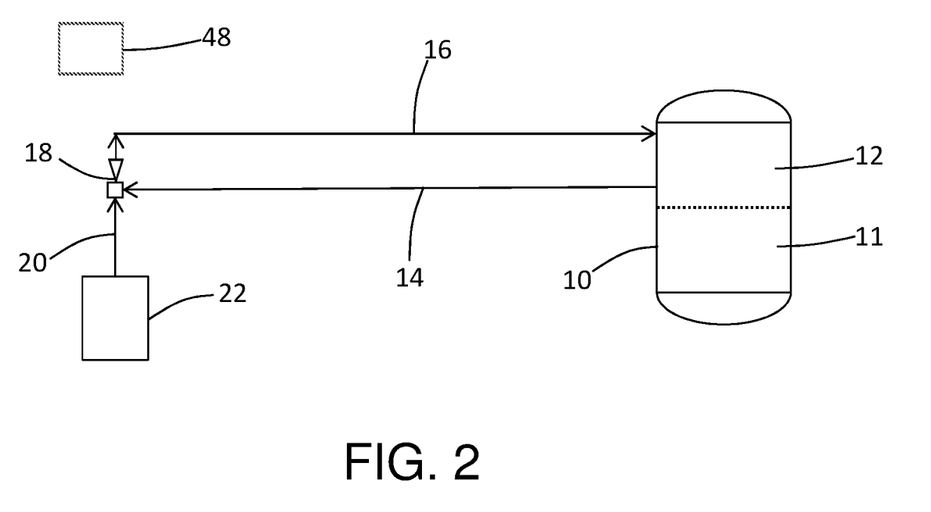
FIG. 2 is a schematic illustration of an example embodiment of a fuel tank inerting system.

With reference now to FIG. 2, an example embodiment of a fuel tank inerting system is shown. As shown in FIG. 2, a fuel tank 10 includes a fuel liquid space 11 and a vapor space 12 therein. Gas components including a condensable portion (e.g., fuel vapor, water vapor) and a non-condensable portion (e.g., nitrogen, oxygen, carbon dioxide) is directed along a flow path 14 such as a duct or other conduit to a suction port of an ejector 18. In some aspects, a non-condensable gas means a gas that remains in a gas phase at normal operating conditions of this or any system described or understood herein. In some aspects, a non-condensable gas means any substance that remains a gas at a pressure of one atmosphere at sea level and a temperature of −75° C.

Figure 3:
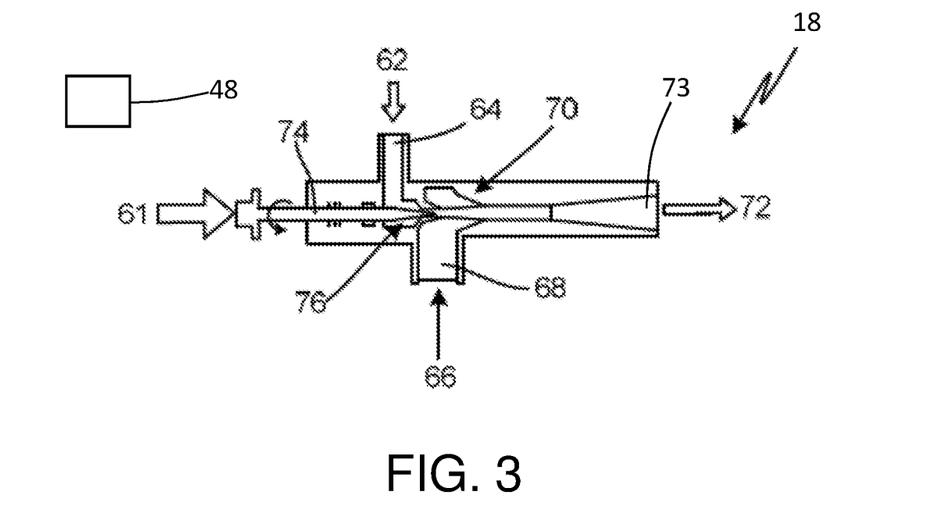
FIG. 3 is a schematic illustration of an example embodiment of an ejector.

An example embodiment of an ejector 18 is shown in FIG. 3. As shown in FIG. 3, the ejector 18 includes a motive fluid port 64 that receives a motive fluid 62, and suction port 68 that receives a suction fluid 66 (in this case the gas components from the fuel tank vapor space 12). The motive fluid 62 and the suction fluid 66 enter a mixing section 70, with the motive fluid 62 acting to provide suction to draw in the suction fluid 66 according to the Bernoulli principle. The mixed fluids 72 are discharged from the ejector 18 through outlet port 73. In some embodiments, the ejector 18 can have a fixed cross-section throat, which can be sized to act as a non-critical (i.e., subsonic) ejector with a relatively open throat area for high secondary flow, or can be sized to act as a critical (i.e., sonic) ejector with a relatively restricted throat area for deeper vacuum. In some embodiments (as shown in FIG. 3), the ejector can provide a controllably variable throat area to accommodate different operating conditions such as during different flight conditions (e.g., different bleed air conditions such as temperature or pressure, conditions of relatively high flow during periods of high demand for inert gas such as at system start-up or during aircraft descent, or conditions of relatively low flow during periods of low demand for inert gas such as during aircraft ascent or level-altitude cruise). In the example embodiment of FIG. 3, the throat area can be varied by control of the position of a threaded screw 74 located in a nozzle 76. To allow adjustability, adjustable threaded screw 74 is sealingly and threadedly engaged to the ejector 18 within nozzle 76 near the motive fluid inlet 64. Depending on the position of adjustable threaded screw 74, the throat area can be reduced (e.g., by driving the adjustable threaded screw 74 farther into the nozzle 76) or enlarged (e.g., by backing the adjustable threaded screw out of the nozzle 76). The position of the adjustable threaded screw can be controlled by an actuator 61, which can be controlled by a controller such as a controller 48. It is noted that although only a single ejector 18 is shown in FIG. 2 and other Figures herein, banks of ejectors arranged in series or in parallel can be used. Further description of arrangements of banks of ejectors in series or parallel can be found in U.S. Patent Application Publication No. US 2019/0282951 A1, the disclosure of which is incorporated herein by reference in its entirety.

With reference again to FIG. 2, inert gas 20 from an inert gas generator 22 is introduced to a motive port of the ejector 18. Any type of inert gas generator can be used as the inert gas generator 22, including but not limited to air separation modules (ASM) that use a membrane to separate air into oxygen-rich and nitrogen-rich components, catalytic reactors that react oxygen in air with a fuel to combust oxygen in the air and produce an inert gas comprising carbon dioxide, water, and nitrogen, or electrochemical inert gas generators that reduce oxygen in air at a cathode, either galvanically (in a fuel cell mode) or electrolytically (in an electrolyzing mode). All types of inert gas generators can be advantageously operated at elevated pressure for provision of inert gas, which may often necessitate a pressure regulator. Use of the elevated pressure inert gas as a motive fluid for the ejector 18 may eliminate the need for a pressure regulator.

The inert gas 20 provides inert gas for passivating (i.e., inerting) the fuel tank 10 and also provides motive force for circulation of the gases from the fuel tank vapor space 12 through the flow path 14. Additional motive force for circulation of the gases can be provided by a pump, fan, blower, or other gas mover (not shown), which can be located along the flow path 14 or in the fuel tank 10. The inert gas 20 provides motive force and mixes with the condensable and non-condensable gases from the flow path 14 and are directed through an outlet port of the ejector 18 to a flow path 16 leading back to the fuel tank 10 where they can promote a non-combustible atmosphere.

Figure 4:
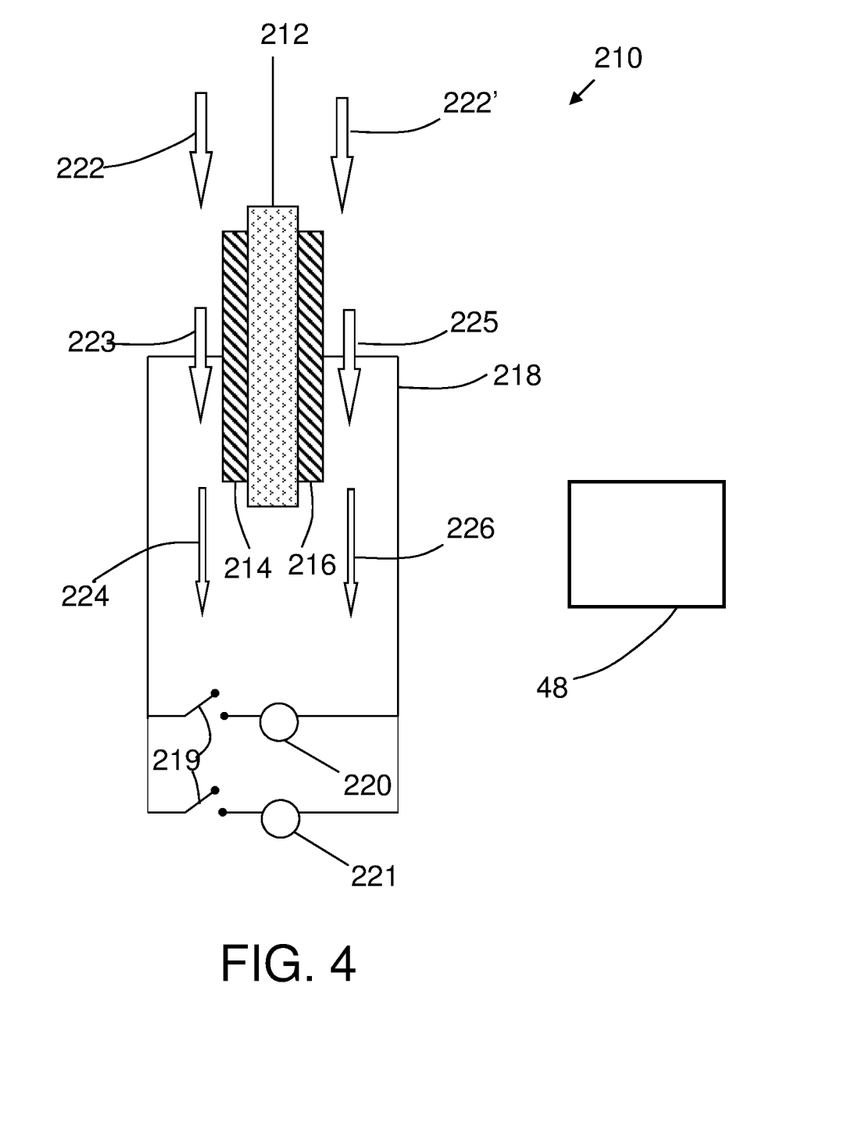
FIG. 4 is a schematic illustration of an electrochemical cell inert gas generator.

Several embodiments of electrochemical inert gas generators are described below. Referring now to FIG. 4, an electrochemical cell 210 is schematically depicted. The electrochemical cell 210 comprises a separator 212 that includes an ion transfer medium. As shown in FIG. 4, the separator 212 has a cathode 214 disposed on one side and an anode 216 disposed on the other side. Cathode 214 and anode 216 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 214 and anode 216 (which can include catalysts) are positioned adjacent to, and preferably in contact with the separator 212 and can be porous metal layers deposited (e.g., by vapor deposition) onto the separator 212, or can have structures comprising discrete catalytic particles adsorbed onto a porous substrate that is attached to the separator 212. Alternatively, the catalyst particles can be deposited on high surface area powder materials (e.g., graphite or porous carbons or metal-oxide particles) and then these supported catalysts may be deposited directly onto the separator 212 or onto a porous substrate that is attached to the separator 212. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 212. In either case, the cathode and anode layers 214 and 216 may also include a binder material, such as a polymer, especially one that also acts as an ionic conductor such as anion-conducting ionomers. In some embodiments, the cathode and anode layers 214 and 216 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 214 and anode 216 can be controllably electrically connected by electrical circuit 218 to a controllable electric power system 220, which can include a power source (e.g., DC power rectified from AC power produced by a generator powered by a gas turbine engine used for propulsion or by an auxiliary power unit) and optionally a power sink 221. In some embodiments, the electric power system 220 can optionally include a connection to the electric power sink 221 (e.g., one or more electricity-consuming systems or components onboard the vehicle) with appropriate switching (e.g., switches 219), power conditioning, or power bus(es) for such on-board electricity-consuming systems or components, for optional operation in an alternative fuel cell mode.

With continued reference to FIG. 4, a cathode supply fluid flow path 222 directs gas from an air source (not shown) into contact with the cathode 214. Oxygen is electrochemically depleted from air along the cathode fluid flow path 223, and can be exhausted to the atmosphere or discharged as nitrogen-enriched air (NEA) (i.e., oxygen-depleted air, ODA) to an inert gas flow path 224 for delivery to an on-board fuel tank (not shown), or to a vehicle fire suppression system associated with an enclosed space (not shown), or controllably to either or both of a vehicle fuel tank or an on-board fire suppression system. An anode fluid flow path 225 is configured to controllably receive an anode supply fluid from an anode supply fluid flow path 222'. The anode fluid flow path 225 includes water when the electrochemical cell is operated in an electrolytic mode to produce protons at the anode for proton transfer across the separator 212 (e.g., a proton transfer medium such as a proton exchange membrane (PEM) electrolyte or phosphoric acid electrolyte). If the system is configured for alternative operation in a fuel cell mode, the anode fluid flow path 225 can be configured to controllably also receive fuel (e.g., hydrogen). The protons formed at the anode are transported across the separator 212 to the cathode 214, leaving oxygen on the anode fluid flow path, which is exhausted through an anode exhaust 226. The oxygen effluent may be entrained in process water in the form of bubbles or dissolved in the process water. Control of fluid flow along these flow paths can be provided through conduits and valves (not shown), which can be controlled by a controller 48 including a programmable or programmed microprocessor.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 212 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid electrolyzers and fuel cells.

During operation of a proton transfer electrochemical cell in the electrolytic mode, water at the anode undergoes an electrolysis reaction according to the formula:

$$H_2O \rightarrow \tfrac{1}{2}O_2 + 2H^+ + 2e^- \qquad (1a)$$

Ozone can also be produced at the anode by a reaction according to the formula:

$$3H_2O \rightarrow O_3 + 6H^+ + 6e^- \qquad (1b)$$

The electrons produced by these reactions are drawn from electrical circuit 218 powered by electric power source 220 connecting the positively charged anode 216 with the cathode 214. The hydrogen ions (i.e., protons) produced by this reaction migrate across the separator 212, where they react at the cathode 214 with oxygen in the cathode flow path 223 to produce water according to the formula:

$$\tfrac{1}{2}O_2 + 2H^+ + 2e^- \rightarrow H_2O \qquad (2)$$

Removal of oxygen from cathode flow path 223 produces nitrogen-enriched air exiting the region of the cathode 214. The oxygen evolved at the anode 216 by the reaction of formula (1) is discharged as anode exhaust 226.

During operation of a proton transfer electrochemical cell in a fuel cell mode, fuel (e.g., hydrogen) at the anode undergoes an electrochemical oxidation according to the formula:

$$H_2 \rightarrow 2H^+ + 2e^- \qquad (3)$$

The electrons produced by this reaction flow through electrical circuit 218 to provide electric power to the electric power sink 221. The hydrogen ions (i.e., protons) produced by this reaction migrate across the separator 212, where they react at the cathode 214 with oxygen in the cathode flow path 223 to produce water according to the formula (2):

$$\tfrac{1}{2}O_2 + 2H^+ + 2e^- \rightarrow H_2O \qquad (2)$$

Removal of oxygen from cathode flow path 223 produces nitrogen-enriched air exiting the region of the cathode 214.

As mentioned above, the electrolysis reaction occurring at the positively charged anode 216 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice some amount of moisture will be removed through the cathode exhaust 224 and/or the anode exhaust 226 (either entrained or evaporated into the exiting gas streams). Accordingly, in some exemplary embodiments, water from a water source is circulated past the anode 216 along an anode fluid flow path (and optionally also past the cathode 214). Such water circulation can also provide cooling for the electrochemical cells. In some exemplary embodiments, water can be provided at the anode from humidity in air along an anode fluid flow path in fluid communication with the anode. In other embodiments, the water produced at cathode 214 can be captured and recycled to anode 216 (e.g., through a water circulation loop, not shown). It should also be noted that, although aspects of this disclosure are contemplated where a single electrochemical cell is employed, in practice multiple electrochemical cells can be electrically connected in series with fluid flow along multiple cathode and anode flow paths routed through manifold assemblies.

In some embodiments, the electrochemical cell 210 can operate utilizing the transfer of oxygen anions across the separator 212. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in a power consuming (e.g., electrolyzer) mode, oxygen at the cathode undergoes an electrochemical reduction reaction according to the formula:

$$\tfrac{1}{2}O_2 + 2e^- \rightarrow O^= \qquad (4).$$

The electrons consumed by this reaction are drawn from electrical circuit 218 powered by electric power source 220 connecting the positively charged anode 216 with the cathode 414. The oxygen anions produced by this reaction migrate across the separator 212, where they undergo an electrochemical oxidation reaction at the anode 214 according to the formula:

$$O^= \rightarrow \tfrac{1}{2}O_2 + 2e^- \qquad (5)$$

Removal of oxygen from cathode flow path 224 produces nitrogen-enriched air exiting the region of the cathode 214. The oxygen produced at the anode 216 by the reaction of formula (5) is discharged as oxygen or an oxygen-enriched air stream as anode exhaust 26.

During operation of an oxygen ion transfer electrochemical cell in a fuel cell mode, oxygen at the cathode undergoes an electrochemical reduction reaction according to the formula (4), and the electrons consumed by this reaction are drawn from electrons liberated at the anode, which flow through electrical circuit 218 to provide electric power to electric power sink (not shown). The oxygen anions produced by this reaction migrate across the separator 212, where they react with fuel such as hydrogen at the anode according to the formula:

$$\tfrac{1}{2}O_2 + 2e^- \rightarrow O^= \qquad (4)$$

and $$H_2 + O^= \rightarrow H_2O + 2e^- \qquad (6)$$

Carbon monoxide (e.g., contained in fuel reformate) can also serve as fuel in solid oxide electrochemical cells. In this case, the oxygen anions produced at the cathode according to formula (4) migrate across the separator 212 where they react with carbon monoxide at the anode according to the formula:

$$CO + O^= \rightarrow CO_2 + 2e^- \qquad (7)$$

Removal of oxygen from cathode flow path 224 produces nitrogen-enriched air exiting the region of the cathode 214. The steam and carbon dioxide produced at the anode 216 by the reactions of formulas (6) and (7) respectively is discharged along with unreacted fuel as anode exhaust 226. Any unreacted fuel that exits anode 216 via anode exhaust flow path 226 can be recycled to fuel flow path 432 using an ejector or blower (not shown), or can be fed to a fuel processing unit wherein the steam and carbon dioxide contribute to reforming.

With reference now to FIGS. 5-12, it is noted here that FIGS. 5-12 show different variations of fuel tank inerting systems, and use some of the same reference numbers as FIG. 2. Any number referenced in a Figure herein may be to describe the same components in any subsequent Figure without the need for (or inclusion of) repeated explicit descriptions of the referenced components. For a description of the components identified by such same numbers, reference can be made to the description of FIG. 2 or other such previous Figure where the reference numbers were first introduced.

Figure 5:
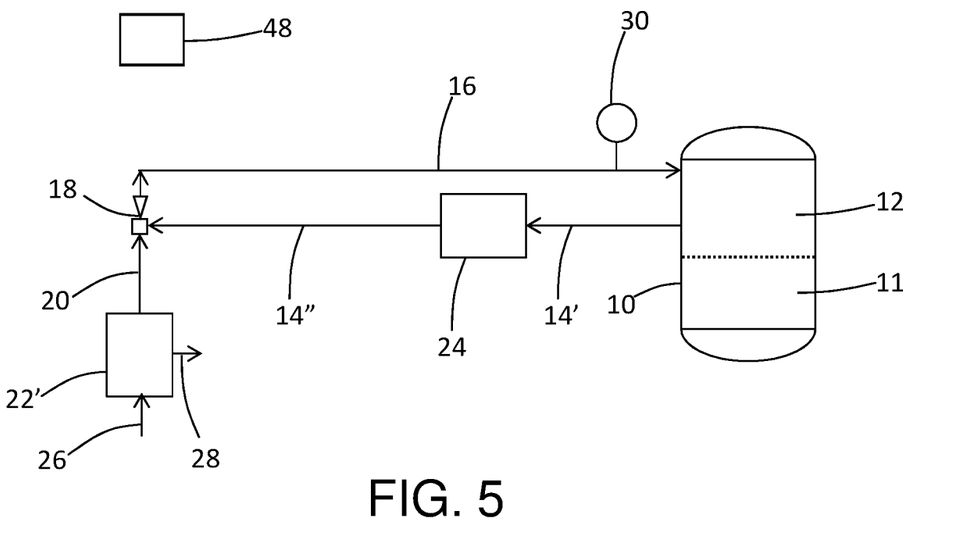
FIG. 5 is a schematic illustration of an example embodiment of a fuel tank inerting system including a gas treatment module.

With reference now to FIG. 5, the Figure includes many of the same components as FIG. 2, with the inclusion of a gas treatment module 24 along the flow path from the fuel tank 10 to the ejector 18, and some additional detail about the inert gas generator 22'. As shown in FIG. 5, the inert gas generator 22' is shown as an inert gas generator that generates inert gas by receiving air 26 from an air source (e.g., bleed air from a compressor such as a compressor section of a gas turbine engine), and separates oxygen from nitrogen such as through a membrane, outputting oxygen or oxygen-enriched air (OEA) 28 and oxygen-depleted air (ODA) (i.e., nitrogen-enriched air or NEA) as inert gas 20. The gas treatment module 24 receives gas from the fuel tank 10 from flow path 14', and discharges gas to the ejector 18 along the flow path 14". The gas treatment module can include one or more modules that provide various gas treatments, including but not limited to thermal treatments for condensation and optional separation of water vapor and/or fuel vapor, separation treatments such as filters for removal of combustible components such as hydrocarbon vapors or oxygen, chemical treatments for removal of combustible components such as hydrocarbon vapors or oxygen. In some aspects, the gas treatment module can be located along the return flow path 16 (see, e.g., FIGS. 9-10). As further shown in FIG. 5, an oxygen sensor 30 can be located along the return flow path 16 to provide input to a controller 48 for controlling operational parameters of components such as the inert gas generator 22', the ejector 18, or the gas treatment module 24.

Figure 6:
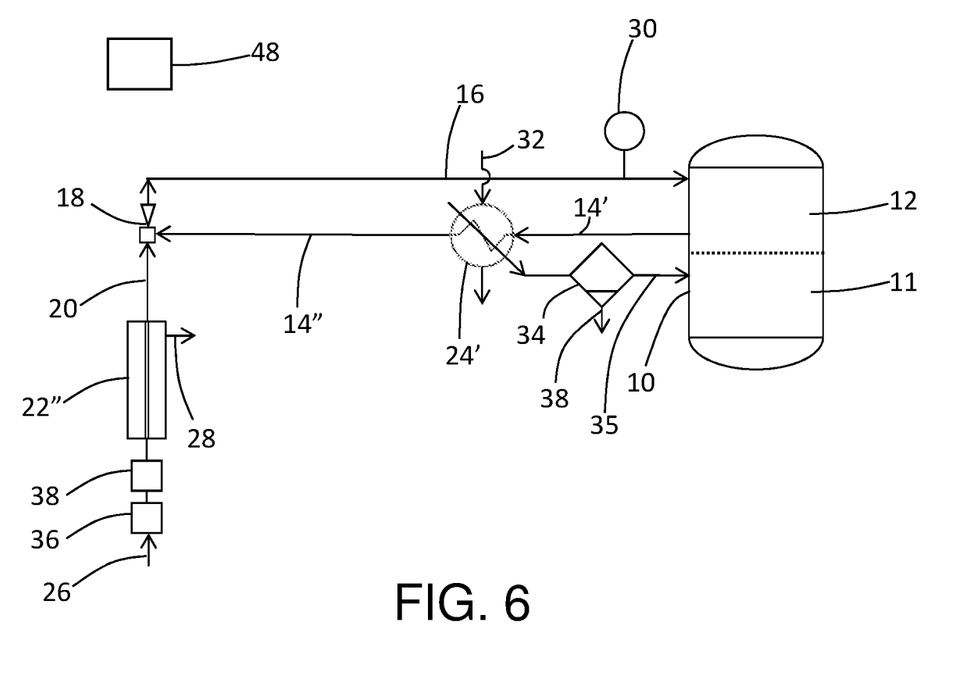
FIG. 6 is a schematic illustration of an example embodiment of a fuel tank inerting system including a condensing heat exchanger.

Turning now to FIG. 6, the Figure includes many of the same components as FIGS. 2 and 5, with further details of the inert gas generator, shown as a tubular membrane air separation module 22" with tubular membranes such as hollow polyimide fibers. Air under pressure (e.g., bleed air) 26 enters a first end the hollow cores of the fibers, and a pressure differential between the pressurized air in the core and a lower pressure on the exterior of the fibers drives smaller oxygen molecules through the fiber walls, leaving oxygen-depleted air to exit as inert gas 20 from the opposite end of the fibers. An ozone treatment module 36 (e.g., a catalytic ozone treatment reactor that catalytically converts ozone to oxygen) and a filter module 38 (e.g., a coalescing filter for removal of contaminants such as oil or fuel) are disposed upstream of the air separation module 22" to for protection of the membrane fibers. With respect to the gas treatment module, thermal treatment is provided by a heat exchanger 24' with a heat rejection side through which the gas from the fuel tank 10 flows. A cooling fluid 32 (e.g., ram air or conditioned air from an environmental control system) flows on a heat absorption side of the heat exchanger 24' and acts as a heat sink to absorb heat from the fuel tank gases. Condensable gases from the fuel tank gases (e.g., fuel vapor, water vapor) are condensed in the heat exchanger 24' and can be directed to a liquid separator 34. The liquid separator 34 separates the condensate into a fuel stream 35 to be returned to the fuel tank 10, and an aqueous stream that can be discarded or used for other on-board processes such as spraying onto a heat exchanger in an environmental conditioning system for enhanced cooling. In some aspects, inclusion of the heat exchanger 24' in the system can provide technical effects including promoting drying and water removal from the fuel system, recapture of fuel vapor, and reduced risk of flammability based on a reduction in temperature and accompanying lower vapor pressure of fuel in the ullage.

Figure 7:
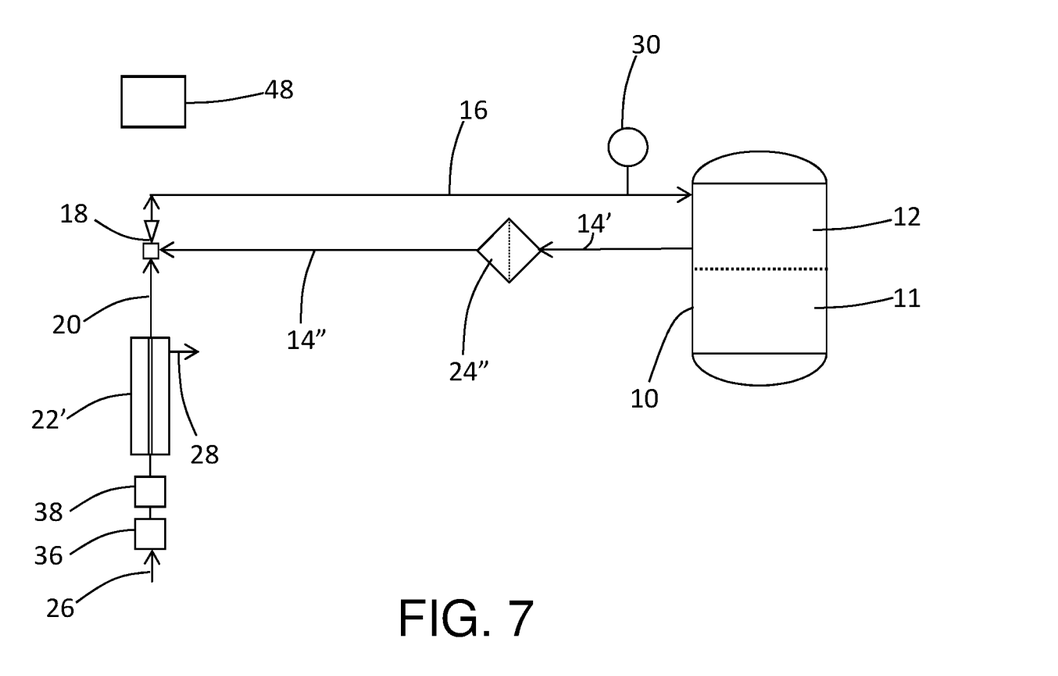
FIG. 7 is a schematic illustration of an example embodiment of a fuel tank inerting system including a fuel vapor filter.

With reference to FIG. 7, the Figure includes many of the same components as FIGS. 2 and 5-6, with further details regarding the gas treatment module, which is shown as a fuel vapor filter 24". The fuel vapor filter 24" can include a fuel vapor sorbent such as an activated charcoal filter that removes fuel vapor from the fuel tank gases on the flow path 14', and discharges a fuel-depleted gas stream to the ejector 18 through flow path 14". In some aspects, inclusion of the fuel vapor filter 24" in the system can provide a technical effect of promoting a reduced risk of flammability by removing one of the combustible reactants, and reduced release of smog-forming fuel vapors from vented tanks compared to other systems that are common in commercial aircraft.

Figure 8:
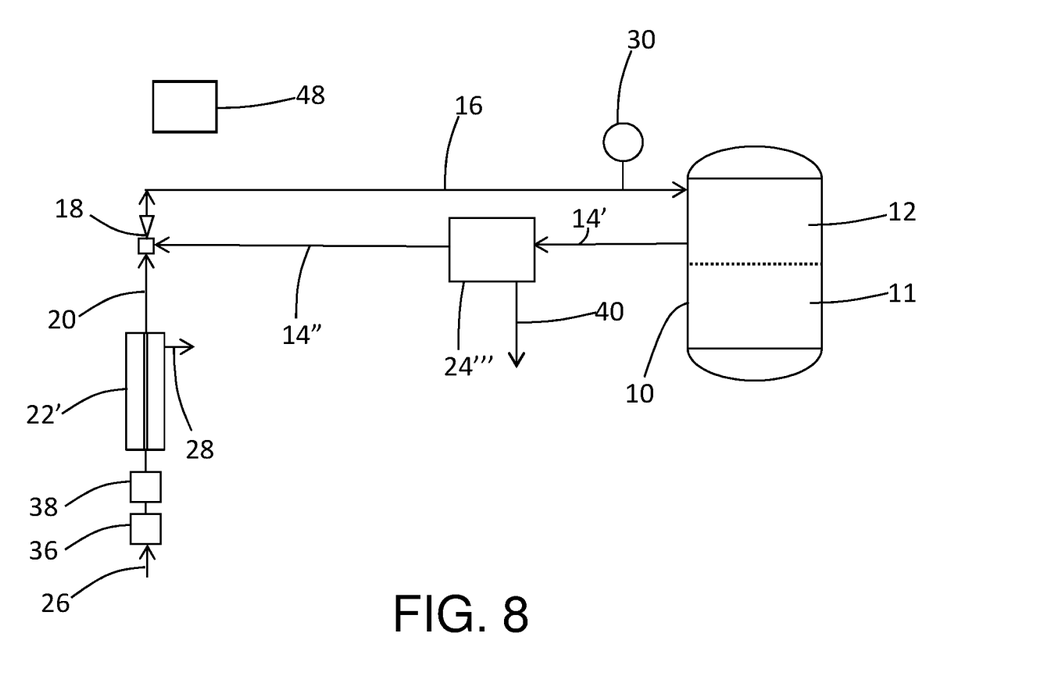
FIG. 8 is a schematic illustration of an example embodiment of a fuel tank inerting system including an oxygen removal module.

FIG. 8 illustrates a system that includes many of the same components as FIGS. 2 and 4-7, with gas treatment provided by a chemical oxygen removal module 24'''. Inclusion of a chemical oxygen removal module 24''' in the system can provide a technical effect of promoting a reduced risk of flammability by removing one of the combustible reactants. Various types of chemical oxygen removal technologies can be utilized, including a catalytic oxidizing reactor that catalytically reacts oxygen and fuel contained in the fuel tank gases in the flow path 14'. Further disclosure regarding catalytic oxidation reactors can be found in U.S. Patent Application Publication No. 2018/0155049 A1, the disclosure of which is incorporated herein by reference in its entirety. Alternatively, the chemical oxygen removal module 24''' can include an electrochemical oxygen removal module such as the module described in FIG. 4 above. In some aspects, a solid oxide electrolyte-based electrochemical cell can be used as the chemical oxygen removal module 24''' to reduce oxygen from the fuel tank gases from the flow path 14', as the solid oxide electrochemical cells can be tolerant of hydrocarbon fuel vapors. In the case of a PEM electrochemical system, hydrogen ions (protons) from a hydrogen source at the anode such as diatomic hydrogen in the case of a fuel cell and water in the case of an electrolyzing gas separator are transported through the electrolyte to combine with oxygen in air flowing through the cathode to generate an inert gas. A PEM electrochemical system offers reduced thermal management requirements compared to solid oxide, however, galvanic operation is subject to restricted choices of fuel due to the susceptibility of PEM anodes to poisoning by CO from reformate and from the incomplete oxidation of liquid fuels.

Figure 9:
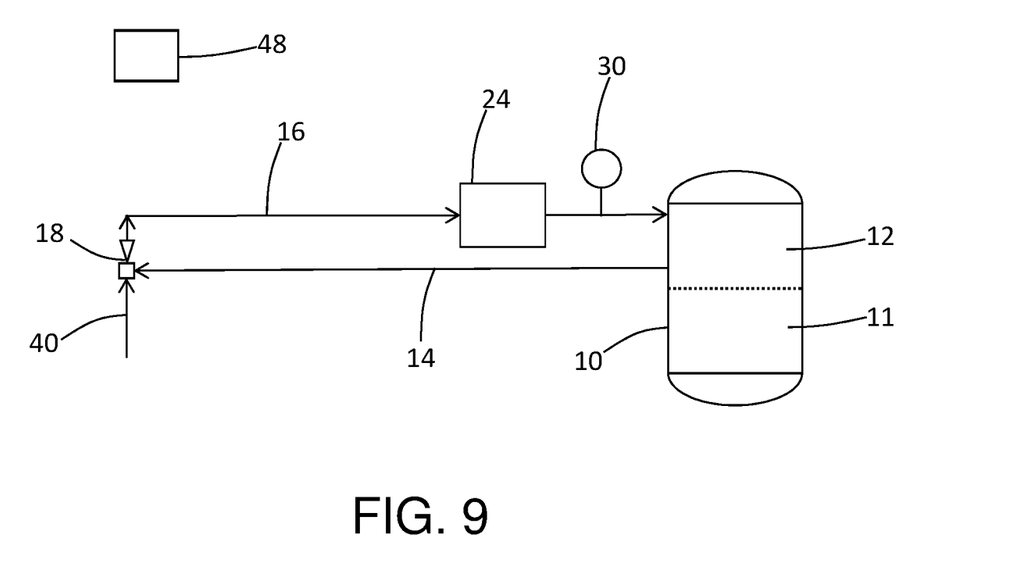
FIG. 9 is a schematic illustration of an example embodiment of a fuel tank inerting system including a gas treatment module on a return flow path to a fuel tank.
Figure 10:
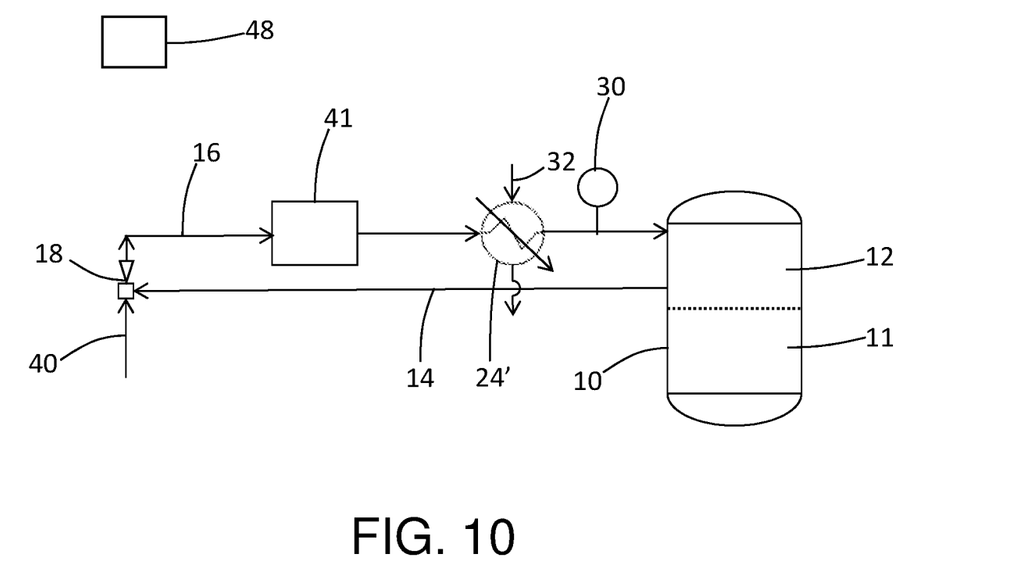
FIG. 10 is a schematic illustration of an example embodiment of a fuel tank inerting system including an inert gas generator and a condensing heat exchanger on a return flow path to a fuel tank.

As mentioned above, in some aspects, the gas treatment module can be located along the flow path 16 that returns gases to the fuel tank 10, such as shown in FIGS. 9-10. Any of the types of fuel treatment modules described above (e.g., inert gas generators such as catalytic oxidation reactors or solid oxide electrochemical inert gas generators, fuel vapor filters, condensing heat exchangers) can be located on the flow path 16. Also, in some aspects of the disclosure (e.g., if the air treatment module 24 generates inert gas regardless of whether it is located on the flow path 14 or the flow path 16), inert gas does not have to be used as a motive fluid. Accordingly, in FIGS. 8-9, air from an air source 40 (e.g., cooled bleed air) is introduced directly to the motive port of the ejector 18 without generation of inert gas and without need of a backpressure regulator such as would be required for a membrane air separation module. In the example embodiment shown in FIG. 10, a chemical inert gas generator 41 (e.g., a catalytic oxidizing reactor or a solid oxide electrolyte-based electrochemical reactor (electrolytic and/or galvanic), both of which can tolerate hydrocarbon vapors) and a condensing heat exchanger 24' are included on the flow path 16 that returns gases to the fuel tank 10. A liquid separator for separating condensate into fuel and aqueous portions with a return of fuel to the fuel tank 10 is not shown, but can be included as shown in FIG. 6.

Additional drying steps (not shown) that can provide a technical effect of promoting avoidance of complications related to water in a fuel tank. In an example, in some aspect, a water transport membrane can be employed such as disclosed in U.S. Patent Application Publication No. 2019/0001264 A1, the disclosure of which is incorporated herein by reference in its entirety. In an example, electrolytic drying can be employed as disclosed in U.S. patent application Ser. No. 16/127,980, the disclosure of which is incorporated herein by reference in its entirety. Drying can be particularly beneficial with chemical oxygen removal processes and equipment (e.g., catalytic oxidation, PEM galvanic and electrolytic) that can result in humid or water-containing inert streams that can lead to water in a fuel tank.

Figure 11:
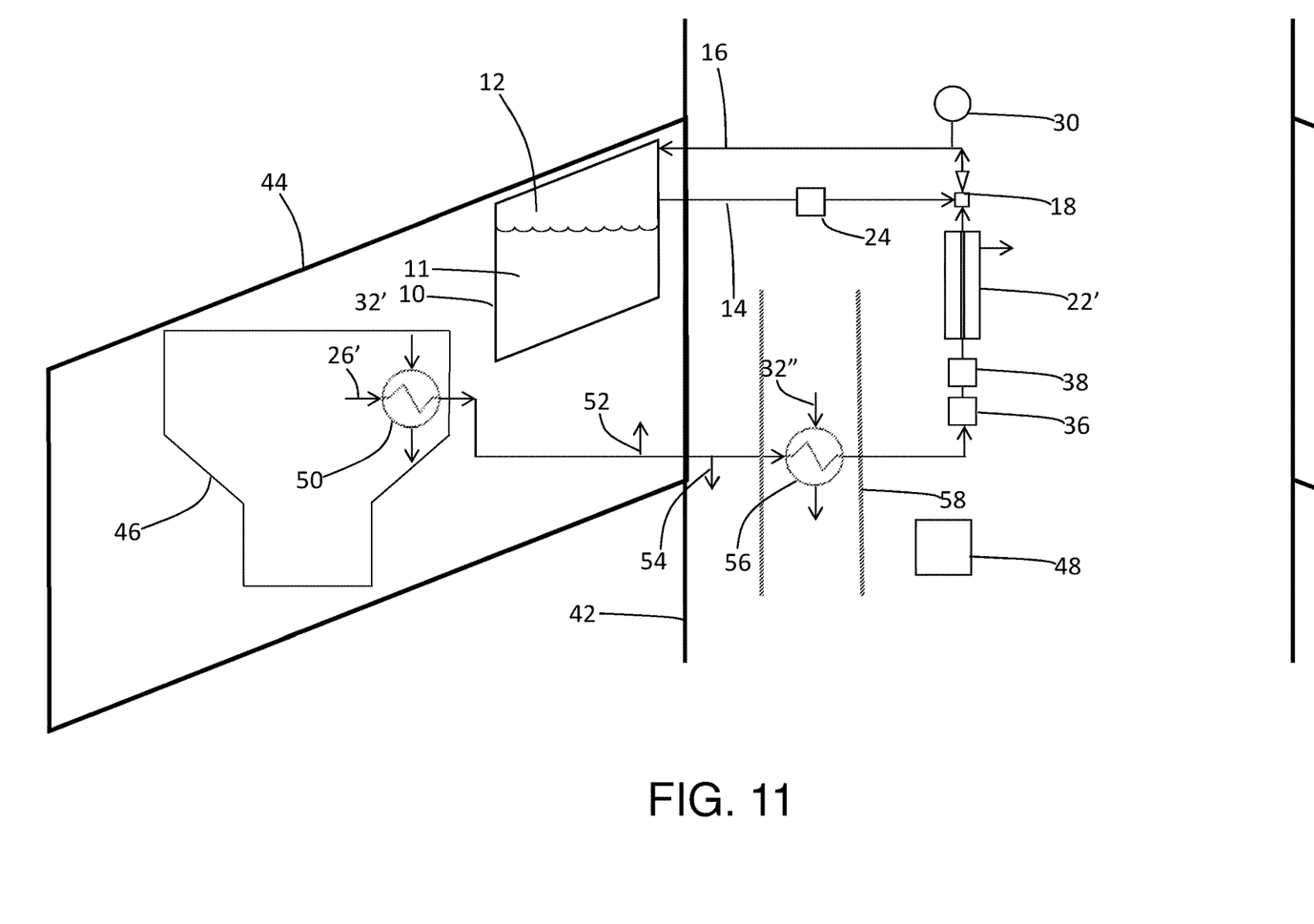
FIG. 11 is a schematic illustration of an example embodiment of a fuel tank inerting system including similar to that of FIG. 5 on an aircraft.
Figure 12:
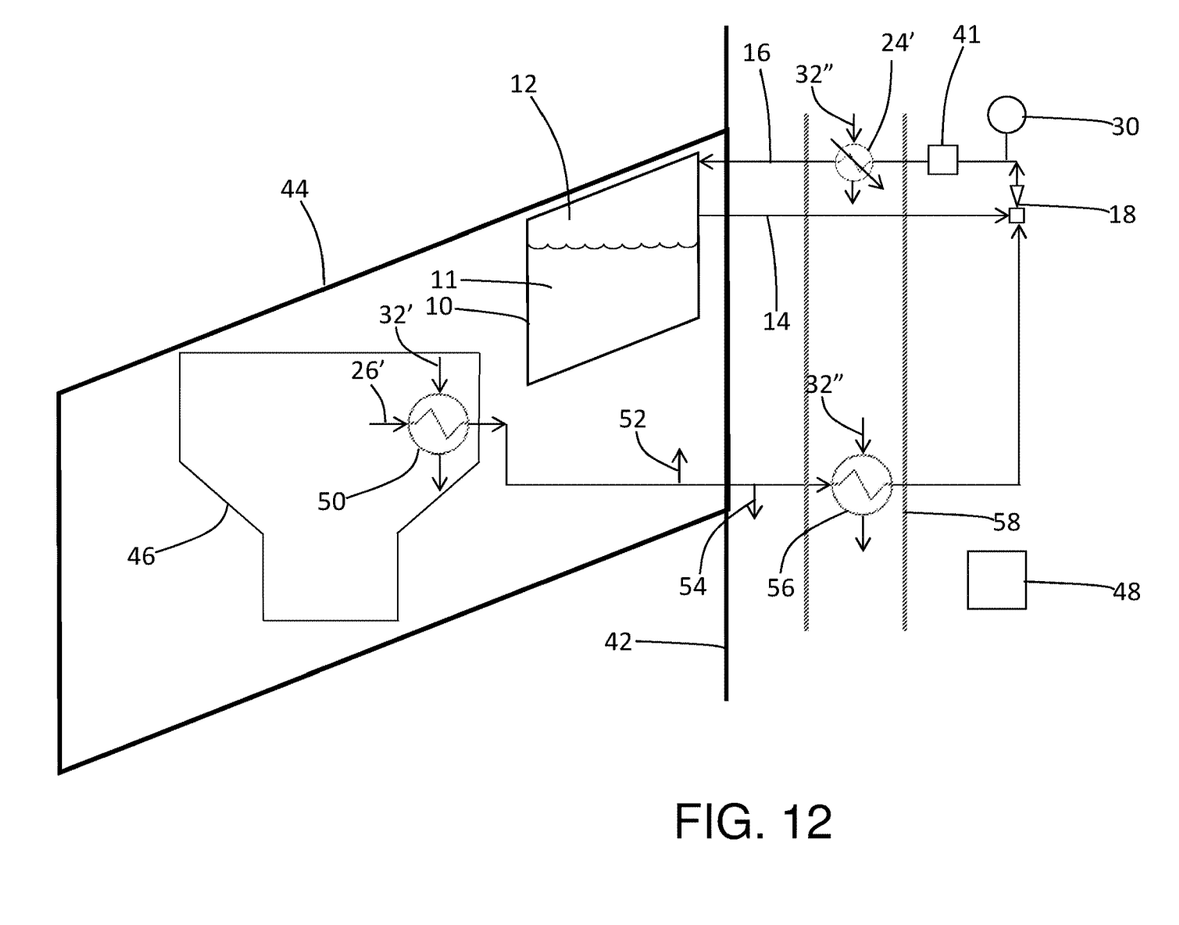
FIG. 12 is a schematic illustration of an example embodiment of a fuel tank inerting system including similar to that of FIG. 10 on an aircraft.

As mentioned above, in some aspects the systems disclosed herein can be on-board an aircraft, and example embodiments of inerting systems on an aircraft are shown in FIGS. 11-12, with FIG. 10 showing a system similar to FIG. 5 on an aircraft, and FIG. 11 showing a system similar to FIG. 10 on an aircraft. FIGS. 11-12 show an aircraft fuselage 42, and an aircraft wing 44 with a wing-mounted gas turbine engine 46. Bleed air 26' is drawn from a compressor section of the engine 46 and directed to a pre-cooler 50 where it is cooled by fan air 32'. Portions of the bleed air are directed to the wing anti-ice system 52 and to the environmental control system 54, and the remaining bleed air is directed to the fuel tank inerting system heat exchanger 56 where it is cooled by ram air 32" in ram air duct 58. In FIG. 11, the cooled ram air is directed to an ozone treatment module 36, a filter module 38, and an air separation module 22' for removal of oxygen. Oxygen-depleted air is then directed to a motive fluid port of the ejector 18, where it draws fuel tank gases through an ejector suction port from flow path 14 that have been treated in gas treatment module 24, and the mixed gases are directed from an ejector outlet port to the flow path 16 for return to the fuel tank 10. In FIG. 12, the cooled ram air flows directly to the motive fluid port of the ejector 18, where it draws fuel tank gases through an ejector suction port from the flow path 14, and the mixed gases are directed to a chemical inert gas generator 41. In some embodiments, the chemical inert gas generator 41 can include a catalytic oxidizer reactor. In some embodiments, the chemical inert gas generator 41 can be an electrochemical inert gas generator.

As further shown in FIGS. 2 and 3-11, the systems disclosed herein can include a controller 48. The controller 48 can be in operative communication with the ejector 18, inert gas generators, the fuel tank 10, oxygen sensor 30, and any associated valves, pumps, compressors, conduits, ejectors, pressure regulators, or other fluid flow components, and with switches, sensors, and other electrical system components, and any other system components to operate the inerting gas system. These control connections can be through wired electrical signal connections (not shown) or through wireless connections. In some embodiments, the controller 48 can be configured to operate the system according to specified parameters, as discussed in greater detail further above. The controller can be an independent controller dedicated to controlling the inert gas generating system, or can interact with other onboard system controllers or with a master controller. In some embodiments, data provided by or to the controller 48 can come directly from a master controller.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for inerting a fuel tank, comprising:
   a fuel tank including a liquid space and a vapor space therein;
   a first flow path that receives fluid comprising non-condensable gas from the fuel tank vapor space;
   an ejector including a suction port that receives the fluid comprising non-condensable gas from the first flow path;
   an inert gas generator configured to generate an inert gas, wherein the ejector includes a motive fluid port configured to receive the inert gas as a motive fluid, and an outlet port configured to discharge a mixed fluid that is a combination of the motive fluid and the fluid comprising non-condensable gas;
   a second flow path from the ejector outlet port to the fuel tank configured to direct the mixed fluid to the fuel tank; and a first gas treatment module arranged along the first flow path between the fuel tank and the ejector, the first gas treatment module configured to receive gas from the fuel tank to treat said gas and discharge the fluid comprising the non-condensable gas to the ejector along the first flow path.

2. The system of claim 1, wherein the inert gas generator is configured to receive air from an air source, and discharge oxygen-depleted air to the ejector motive fluid port.

3. The system of claim 2, wherein the inert gas generator includes an oxygen separation medium configured to remove oxygen from the air received from the air source.

4. The system of claim 1, wherein the inert gas generator includes a catalytic reactor configured to react oxygen from an air source with a hydrocarbon fuel.

5. The system of claim 1, wherein the inert gas generator includes an electrochemical cell configured to remove oxygen from a gas stream.

6. The system of claim 1, wherein the first gas treatment module includes a heat exchanger in operative thermal communication with a heat sink.

7. The system of claim 5, wherein the first gas treatment module includes a fuel vapor removal module.

8. The system of claim 7, wherein the fuel vapor removal module includes a fuel vapor separation medium.

9. The system of claim 5, wherein the first gas treatment module includes an oxygen removal module.

10. The system of claim 9, wherein the oxygen removal module includes a catalytic reactor that reacts oxygen with a fuel, or an electrochemical cell that removes oxygen from a gas stream.

11. An aircraft, comprising an aircraft body, a fuel tank, an engine with a fuel inlet in operative fluid communication with the fuel tank, and a system for inerting the fuel tank according to claim 1.

12. A method of inerting a fuel tank, comprising:
directing a fluid comprising non-condensable gas from a vapor space in the fuel tank to a first gas treatment module and then to a suction port of an ejector;
directing an inert gas as a motive fluid to a motive fluid port of the ejector from an inert gas generator;
mixing the fluid comprising the non-condensable gas from the suction port and the inert gas from the motive fluid port within the ejector to generate a mixed gas; and
directing the mixed gas from an outlet port of the ejector to the fuel tank.

13. A system for inerting a fuel tank, comprising:
a fuel tank including a liquid space and a vapor space therein;
a first flow path that receives fluid comprising non-condensable gas from the fuel tank vapor space;
an ejector including a suction port that receives the fluid comprising non-condensable gas from the first flow path, a motive fluid port that receives a motive fluid from a source of motive fluid, and an outlet port that discharges the motive fluid and the fluid comprising non-condensable gas;
a second flow path from the ejector outlet port to the fuel tank;
a first gas treatment module, fluidly connected to the ejector or the first or second flow paths and configured to provide inert gas to the motive fluid port of the ejector; and
a second gas treatment module disposed on the first flow path or on the second flow path and includes an oxygen removal module, wherein the oxygen removal module includes a catalytic reactor that reacts oxygen with a fuel, or an electrochemical cell that removes oxygen from a gas stream.

* * * * *